(12) United States Patent
Al-Malaika

(10) Patent No.: US 6,936,204 B2
(45) Date of Patent: Aug. 30, 2005

(54) THERMOPLASTIC MOLDING COMPOSITIONS AND POLYMER ADDITIVES

(75) Inventor: Sahar Al-Malaika, Sutton Coldfield (GB)

(73) Assignee: Color Matrix Europe Ltd., Merseyside (GB)

( * ) Notice: Subject to any disclaimer, the term of this patent is extended or adjusted under 35 U.S.C. 154(b) by 279 days.

(21) Appl. No.: 10/046,624

(22) Filed: Oct. 29, 2001

(65) Prior Publication Data

US 2003/0004244 A1 Jan. 2, 2003

Related U.S. Application Data

(63) Continuation of application No. PCT/GB00/01646, filed on Apr. 28, 2000.

(30) Foreign Application Priority Data

Apr. 29, 1999 (GB) .............................................. 9909956

(51) Int. Cl.[7] ......................... B29C 33/40; B29C 42/02; B29C 45/00; B29C 39/02; B29C 67/00
(52) U.S. Cl. ....................... 264/225; 264/523; 264/524; 264/540
(58) Field of Search ................................ 264/523, 524, 264/540, 225

(56) References Cited

U.S. PATENT DOCUMENTS

| | | | |
|---|---|---|---|
| 4,330,661 A | 5/1982 | Go ............................. | 528/173 |
| 4,394,470 A | 7/1983 | Werner et al. ................ | 524/56 |
| 4,837,115 A | 6/1989 | Igarashi et al. .......... | 428/36.92 |
| 4,873,279 A | 10/1989 | Nelson ........................ | 524/384 |
| 5,250,333 A | 10/1993 | McNeely et al. .......... | 428/35.7 |
| 5,308,648 A | 5/1994 | Prince et al. ................ | 427/212 |
| 5,308,892 A | 5/1994 | Zickler et al. .............. | 523/318 |
| 5,340,884 A | 8/1994 | Mills et al. .................. | 125/420 |
| 5,650,469 A | 7/1997 | Long et al. .................. | 525/425 |
| 5,684,116 A | 11/1997 | Martl et al. .................. | 528/176 |
| 5,789,528 A | 8/1998 | Martl et al. .................. | 528/279 |
| 5,844,027 A | 12/1998 | Burdick et al. ............. | 524/110 |
| 5,863,964 A | 1/1999 | Teumac et al. ............. | 523/100 |
| 5,864,005 A | 1/1999 | Kim et al. ................... | 528/176 |
| 5,874,515 A | 2/1999 | Huang et al. ................ | 528/176 |
| 5,874,517 A | 2/1999 | Huang et al. ................ | 528/271 |
| 5,922,828 A | 7/1999 | Schiraldi ..................... | 528/279 |
| 6,099,778 A | 8/2000 | Nelson et al. ........... | 264/176.1 |

FOREIGN PATENT DOCUMENTS

| | | |
|---|---|---|
| EP | 0272417 A2 | 11/1987 |
| EP | 0455370 A2 | 4/1991 |
| EP | 0691370 A2 | 7/1995 |
| EP | 0878502 A2 | 4/1998 |
| WO | WO 9323449 | 5/1993 |
| WO | WO 0066659 | 4/2000 |

OTHER PUBLICATIONS

Villan. F. et al., "Thermal degradation of polyethylene terephthalate: study of polymer stabilization." *Polymer Degradation and Stability*, 49:393–397 (1995).

*Primary Examiner*—Patrick D. Niland
(74) *Attorney, Agent, or Firm*—David A. Farah; Sheldon & Mak PC

(57) ABSTRACT

A thermoplastic molding composition for making a molded article comprising (i) a polymer component selected from the group consisting of polyethylene terephthalate, a copolyester of polyethylene terephthalate, and a combination of polyethylene terephthalate and a copolyester of polyethylene terephthalate, and (ii) a polymer additive comprising one or more than one hydroxylic compound comprising from 3 to about 8 hydroxy groups. The amount of one or more than one hydroxylic compound is sufficient to decrease the level of acetaldehyde in the molded article that would be present without including the one or more than one hydroxylic compound in the thermoplastic molding composition. A method for making a molded article with decreased levels of acetaldehyde comprising, first, providing a thermoplastic molding composition according to the present invention, and, second, injection molding the thermoplastic molding composition to form a molded article.

60 Claims, No Drawings

THERMOPLASTIC MOLDING COMPOSITIONS AND POLYMER ADDITIVES

CROSS-REFERENCE TO RELATED APPLICATION

This application is a continuation of international Patent Application No. PCT/GB00/01646 filed Apr. 28, 2000, which claims priority from United Kingdom Application No. GB 9909956.6 filed Apr. 29, 1999, the contents of which are incorporated by reference in this disclosure in their entirety.

BACKGROUND

Polyethylene terephthalate is used on a large scale for the manufacture of food packages such as bottles. Such bottles are widely utilized for packaging of beverages, such as carbonated soft drinks, beer, or mineral water. Whilst some beverage bottlers prefer clear non-pigmented bottles, others prefer colored bottles. Particularly in the case of bottles intended for holding carbonated drinks, a sandwich construction is used in which nylon or an ethylene/vinyl alcohol resin is incorporated in a multi-layer preform with polyethylene terephthalate in order to improve the gas barrier properties of the bottles. It has also been proposed, for the same purpose, to admix a polyamide with the polyethylene terephthalate since the presence of the polyamide provides gas barrier properties.

The technique commonly used to manufacture bottles from molding compositions comprising polyethylene terephthalate generally involves a two stage process. In the first stage granules of the molding composition are injection molded to make a preform. In the second stage the preform is blow molded to the desired shape.

In such a process, the polyethylene terephthalate is typically post-condensed and has a molecular weight in the region of about 25,000 to 30,000 Daltons. However, it has also been proposed to use a fibre grade polyethylene terephthalate, which is cheaper but is non-post-condensed, with a lower molecular weight in the region of about 20,000 Daltons. It has further been suggested to use copolyesters of polyethylene terephthalate which contain repeat units from at least 85 mole % terephthalic acid and at least 85 mole % of ethylene glycol. Dicarboxylic acids which can be included, along with terephthalic acid, are exemplified by phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, and sebacic acid. Other diols which can be incorporated in the copolyesters, in addition to ethylene glycol, include diethylene glycol, triethylene glycol, 1,4-cyclohexanedimethanol, propane-1,3-diol, butane-1,4-diol, pentane-1,5-diol, hexane-1,6-diol, 3-methylpentane-2,4-diol, 2-methylpentane-1,4-diol, 2,2,4-trimethylpentane-1,3-diol, 2-ethylhexane-1,3-diol, 2,2-diethylpropane-1,3-diol, hexane-1,3-diol, 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. In this disclosure, the term "polyethylene terephthalate" includes not only polyethylene terephthalate but also such copolyesters.

If the eventual bottle is to be colored, then it is conventional to admix a pigment or pigments with the polyethylene terephthalate granules charged to the hopper of the injection molding machine used to make the bottle preform. For this purpose, the pigment or mixture of pigments can be added as a solid concentrate or in powder form or as a dispersion in a liquid carrier. Such liquid carriers are generally inert materials such as hydrocarbon oils, esters, alcohols, or a mixture of two or more thereof. Any such liquid carrier must be selected so as to have good compatibility with polyethylene terephthalate and, if the pigment is to be dissolved, also good solvent properties for the pigment or pigments. In addition, if the molding composition is to be used for manufacture of food packages, the carrier must be non-toxic. Moreover, the quantity of carrier used should desirably be kept to a minimum so as not to affect adversely the properties of the polyethylene terephthalate in the preform or bottle.

The softening point of polyethylene terephthalate is high. Thus, a typical temperature needed for processing of polyethylene terephthalate is in the region of 260° C. to 285° C. A recognized problem in the industry is that, under the high temperatures and shear conditions needed for injection molding to make a preform and for blow molding of the preform to make a bottle, polyethylene terephthalate tends to degrade, resulting in the formation of acetaldehyde. The presence of acetaldehyde in the material of the finished bottle is undesirable, particularly when the bottle is to be used for products for human consumption, because the acetaldehyde can migrate from the walls of the package or bottle into its contents, whereupon it adversely affects the flavor and fragrance properties of the comestible product. Although the migration of acetaldehyde from a polyethylene terephthalate bottle into a carbonated drink is undesirable, a trace of acetaldehyde can often be tolerated because the taste and fragrance of the drink are not usually noticeably affected. However, the presence of even minute amounts of acetaldehyde in a non-carbonated drink, such as still mineral water, tends to impart a most undesirable adverse taste and odor to the drink.

Methods for measurement of acetaldehyde in industrially injection-molded polyethylene terephthalate preforms have been described by F. Villain et al., Journal of Polymer Science, Vol. 52, 55–60 (1994).

Attempts have been made by equipment manufacturers to modify the design of the processing machinery so as to enable the intensity of the processing conditions needed to make the bottle preforms and for blow molding thereof to be reduced. In this way, it was hoped that the formation of acetaldehyde in the course of the high temperature processing conditions could be minimized.

The use of vented extrudes to devolatilize polymers has been disclosed, for example, in U.S. Pat. No. 5,597,891, which teaches a process for producing reduced acetaldehyde polyester articles by using a purge gas in a vented extruder to remove acetaldehyde. U.S. Pat. No. 5,102,594 discloses a thermoplastic condensation polymer supplied to a vented extruder in powdered form.

In Swiss Patent No. 655,938, there is disclosed a procedure for preparing high molecular weight polyethylene terephthalate containing less than 5 ppm dissolved and bound acetaldehyde which involves treatment of the polyethylene terephthalate with a pure alcohol or alcohol/water mixture at a temperature of at least 130° C. followed by post-condensation at 240° C. to 245° C. in an inert gas or under vacuum.

Another approach that has been attempted is to use additives which will react with the acetaldehyde as it is formed. However, it is important that any additive used should not adversely affect the properties of the bottle or other final product. In particular, it is important not to add a material which can impart undesirable haze or color. Thus, in a paper by F. Villain et al., Polymer Degradation and Stability, 49, 1995, 393–397, it is proposed to incorporate additives in polyethylene terephthalate in order to minimize the amounts of acetaldehyde and formaldehyde produced during the injection molding process. Various stabilizing additives were tested by these authors including terephthalic acid, phthalimide, dimethyl terephthalate, 4-hydroxybenzoic acid, 5-hydroxyisophthalic acid, 3,5-dihydroxybenzoic acid, phenyl isocyanate, phthalic anhydride, 4-aminobenzoic acid, resorcinol, and diphenylamine. They reported that, when used in an injection machine at a weight percentage of 1% based upon the weight of polyethylene terephthalate, 4-aminobenzoic acid, 3,5-dihydroxybenzoic acid and diphenylamine were found to be the most effective additives under laboratory conditions. These authors further postulated that 4-aminobenzoic acid acts as both a free radical scavenger and a hydroxyethyl chain blocker.

U.S. Pat. No. 5,258,233 describes polyester/polyamide blends which have gas barrier properties and through reduction of acetaldehyde concentration in the polyester improve the storage properties of foodstuffs over previously reported blends. The use of low molecular weight partially aromatic polyamides having a number average molecular weight of less than 15,000 or low molecular weight aliphatic polyamides having a number average molecular weight of less than 7,000 is the to be more effective in reducing residual acetaldehyde in polyethylene terephthalate based polyesters than high molecular weight polyamides. However, a recognized problem associated with utilizing a polyamide as an additive in polyethylene terephthalate formulations is that it causes discoloration of the preform due to degradation during the melt extrusion process.

International Patent Publication No. WO 94/29378 teaches a polyester/zeolite admixture which is the to have an excellent gas barrier property and an improved flavor retaining property as well as clarity. Addition of small- or medium-pore zeolites in a critical amount to a polyester is the to reduce the concentration of acetaldehyde in the polyester without producing haze.

In International Patent Publication No. WO 98/18848 there is proposed a process for producing molded articles comprising the steps of:

a) melt reacting at least one glycol and at least one dicarboxylic acid to form a polyester having an I.V. (inherent viscosity) of at least about 0.5 dl/g, wherein the at least one glycol is selected from the group consisting of glycols having up to 10 carbon atoms and mixtures thereof and the dicarboxylic acid is selected from the group consisting of alkyl dicarboxylic acids having 2 to 16 carbon atoms, aryl dicarboxylic acids having 8 to 16 carbon atoms and mixtures thereof in the presence of a catalyst which is substantially free from Co compounds;

b) adding an acetaldehyde reducing additive to the polyester to form a reduced acetaldehyde polyester; and c) forming the reduced acetaldehyde polyester into shaped articles directly from step b.

Such a process can thus be operated as a "melt-to-mold" process. As acetaldehyde reducing additive there can be used any additive known to reduce acetaldehyde. Recommended additives for this purpose include polyamides, polyesteramides, nylon-6 and other aliphatic polyamides, ethylenediaminetetraacetic acid, alkoxylated polyols, bis(4-hydroxyethoxyphenyl)-sulphone, zeolite compounds, 5-hydroxyphthalic acid, poly(ethylene isophthalate), supercritical carbon dioxide, and protonic acid catalysts. Other known scavengers such as polyethyleneimine can also be used.

Another approach, which is described in U.S. Pat. No. 4,361,681, involves capping of the hydroxyl end groups of polyethylene terephthalate with anhydrides such as succinic anhydride or phthalic anhydride. The use of pyromellitic anhydride for end capping of polyethylene terephthalate has been proposed in U.S. Pat. No. 5,243,020.

European Patent Publication No. 0 878 502 A discloses a stabilizer mixture for thermally stabilizing organic polymers, especially food packages, consisting of (1)— tocopherol, (2) a solid polyhydroxy compound which is selected from the group consisting of triglycerin, ditrimethylolpropane, dipentaerythritol, tripentaerythritol, D-mannitol, D-sorbitol, and xylitol or (3) an acid binding material or a mixture of components (2) and (3). Amongst the polymers which can be thermally stabilized in this way are the to be polyesters, including polyethylene terephthalate. However, no experimental evidence is provided which involves use of polyethylene terephthalate.

U.S. Pat. No. 5,250,333 proposes polyethylene terephthalate modified by incorporation in the polymer structure of an alkoxylated polyol, such as ethoxylated trimethylolpropane. The modified polyethylene terephthalate is described as melt strength enhanced and extrusion blow moldable and is the to be useful for making bottles or containers having hot fill applications. Reduced yellowness is the to be provided.

In U.S. Pat. No. 5,939,516 there is proposed production of a modified polyethylene terephthalate by incorporating in the polymer molecule a polyhydroxyl chain branching agent such as trimethylol propane, mesoerythritol, duclitol (galacticol), adonitol (ribitol), or pentaerythritol.

Addition of a polyamide to reduce the concentration of acetaldehyde in bottles made from polyethylene terephthalate is taught in U.S. Pat. Nos. 5,340,884, 5,650,469, and 4,837,115.

Production of a copolyester by polycondensing terephthalic acid, isophthalic acid and a glycol, followed by a two stage heat treatment to reduce the acetaldehyde content is proposed in U.S. Pat. No. 5,864,005.

Use of primary and secondary antioxidants to reduce the amount of acetaldehyde generated by subjecting polyethylene terephthalate to high temperatures is taught in U.S. Pat. No. 5,874,517. Addition of primary and secondary antioxidants to reduce gel formation in polyethylene terephthalate is suggested in U.S. Pat. No. 5,874,515.

U.S. Pat. No. 5,863,964 proposes addition of dl-tocopherol to a liner component for a potable fluid container for preventing off-flavors due to the presence of aldehydes in the fluid.

A stabilizing system is proposed in U.S. Pat. No. 5,844,027 for organic material susceptible to thermal, oxidative or/and light induced deterioration. This includes— tocopherol.

There remains, however, a need to provide a polymer additive for incorporation in molding compositions which comprise polyethylene terephthalate, a copolyester thereof, or a blend of one of these with a polyamide, in order to reduce the amount of acetaldehyde formed during processing of such molding compositions.

There is a further need to provide a polymer additive which does not lead to discoloration or haze when polyester molding compositions which consist of or contain polyethylene terephthalate or a copolymer thereof and which contain the polymer additive are subjected to injection molding and/or blow molding.

There is a still further need to provide a process for production from molding compositions containing polyethylene terephthalate of blow molded articles, such as bottles and preforms therefor, which will not release significant quantities of acetaldehyde after formation.

SUMMARY

According to one embodiment of the present invention, there is provided a thermoplastic molding composition for making a molded article. The composition comprises (i) a polymer component selected from the group consisting of polyethylene terephthalate, a copolyester of polyethylene terephthalate, and a combination of polyethylene terephthalate and a copolyester of polyethylene terephthalate, and (ii) a polymer additive comprising one or more than one hydroxylic compound comprising from 3 to about 8 hydroxy groups. The amount of one or more than one hydroxylic compound is sufficient to decrease the level of acetaldehyde in the molded article that would be present without including the one or more than one hydroxylic compound in the thermoplastic molding composition.

The hydroxylic compound can be selected from the group consisting of an aliphatic hydroxylic compound, an aliphatic-cycloaliphatic hydroxylic compound and a cycloaliphatic hydroxylic compound, or selected from the group consisting of triglycerin, trimethylolpropane, dipentaerythritol, tripentaerythritol, D-mannitol, D-sorbitol and xylitol. The amount of the one or more than one hydroxylic compound can be from about 0.0001% to about 2% by weight of the polymer component.

In one embodiment, two of the hydroxy groups of the hydroxylic compound are separated from one another by exactly one carbon atom. In another embodiment, the polymer additive further comprises a liquid carrier. In a preferred embodiment, the one or more than one hydoroxylic compound is substantially uniformly distributed in the liquid carrier. In a particularly preferred embodiment, the ratio of the weight of the hydroxylic compound to the weight of the liquid carrier is from about 0.1:1 to about 1.5:1. In another embodiment, the liquid carrier comprises a polyester-compatible organic oil-based vehicle.

In a preferred embodiment, the polymer additive further comprises one or more than one polyester-compatible colorant. In a particularly preferred embodiment, the polymer additive further comprises an antioxidant.

In a preferred embodiment, the thermoplastic molding composition further comprises one or more than one polyester-compatible colorant. In a particularly preferred embodiment, the thermoplastic molding composition further comprises an antioxidant.

In one embodiment, the polymer component further comprises a polyamide.

According to another embodiment of the present invention, there is provided a preform for use in a forming a bottle made with a composition of the present invention. In one embodiment, there is provided a bottle made of the preform of the present invention. According to another embodiment of the present invention, there is provided a bottle made with a composition of the present invention.

In one embodiment, there is provided a molded article made with the thermoplastic molding composition, where the thermoplastic molding composition comprises (i) a polymer component selected from the group consisting of polyethylene terephthalate, a copolyester of polyethylene terephthalate, and a combination of polyethylene terephthalate and a copolyester of polyethylene terephthalate, and (ii) a polymer additive comprising one or more than one hydroxylic compound comprising from 3 to about 8 hydroxy groups. The amount of one or more than one hydroxylic compound is sufficient to decrease the level of acetaldehyde in the molded article that would be present without including the one or more than one hydroxylic compound in the thermoplastic molding composition. In a preferred embodiment, the decrease in the level of acetaldehyde is decreased from about 30% to about 70%. In another preferred embodiment, the thermoplastic molding composition further comprises colorant.

In a preferred embodiment, the molded article comprises a preform. In a particularly preferred embodiment, the molded article comprises a bottle.

According to another embodiment of the present invention, there is provided a method for making a molded article with decreased levels of acetaldehyde. The method comprises, first, providing a thermoplastic molding composition according to the present invention, and, second, injection molding the thermoplastic molding composition to form a molded article. The amount of one or more than one hydroxylic compound is sufficient to decrease the level of acetaldehyde in the molded article that would otherwise result without including the one or more than one hydroxylic compound in the thermoplastic molding composition. In a preferred embodiment, the molded article is a preform for use in a forming a bottle. In another preferred embodiment, the molded article is a bottle.

DESCRIPTION

According to the present invention, there is provided a polymer additive for addition to a thermoplastic molding composition comprising polyethylene terephthalate or a copolyester thereof so as to effect reduction of the level of acetaldehyde resulting after processing thereof, the polymer additive comprising a hydroxylic compound selected from aliphatic hydroxylic compounds containing at least two hydroxy groups, aliphatic-cycloaliphatic compounds containing at least two hydroxy groups, and cycloaliphatic hydoroxylic compounds containing at least two hydroxy groups.

Any aliphatic chain in the hydroxylic compound can include not only carbon atoms but also one or more hetero atoms which can be selected, for example, from nitrogen, oxygen and sulphur atoms. Any cycloaliphatic ring present in the hydroxylic compound can be monocyclic or part of a bicyclic or polycyclic ring system and can be carbocyclic or heterocyclic. Any heterocyclic ring present in the hydroxylic compound can be monocyclic or part of a bicyclic or polycyclic ring system and can include one or more hetero atoms which can be selected, for example, from nitrogen, oxygen and sulphur atoms.

The hydroxylic compounds preferably contain from 3 to about 8 hydroxy groups. They can contain one or more substituents, such as ether, carboxylic acid, carboxylic acid amide or carboxylic acid ester groups.

Preferred hydroxylic compounds include those having a pair of hydroxy groups which are attached to respective carbon atoms which are separated one from another by at least one atom. Especially preferred hydroxylic compounds are those in which a pair of hydroxy groups are attached to respective carbon atoms which are separated one from another by a single carbon atom.

As examples of suitable hydroxylic compounds there can be mentioned diols such as ethylene glycol, propane-1,2-diol, propane-1,3-diol, butane-1,4-diol, pentane-1,5-diol, hexane-1,2-diol, 2-methylpentane-2,4-diol, 2,5-dimethylhexane-2,5-diol, cyclohexane-1,2-diol, cyclohexane-1,1-dimethanol, diethylene glycol, triethylene glycol, and polyethylene glycols having, for example, a molecular weight from about 800 Daltons to about 2000 Daltons, such as Carbowax® 1000 which has a molecular weight of about 950 Daltons to about 1050 Daltons and contains from about 20 to about 24 ethyleneoxy groups per molecule; triols, such as glycerol, trimethylolpropane, 2,3-di-(2'-hydroxyethyl)-cyclohexan-1-ol, hexane-1,2,6-triol, 1,1,1-tris-(hydroxymethyl)ethane, 3-(2'-hydroxyethoxy)-propane-1,2-diol, 3-(2'-hydroxypropoxy)-propane-1,2-diol, 2-(2'-hydroxyethoxy)-hexane-1,2-diol, 6-(2'-hydroxypropoxy)-hexane-1,2-diol, 1,1,1-tris-[(2'-hydroxyethoxy)-methyl]-ethane, 1,1,1-tris-[(2'-hydroxypropoxy)-methyl]-propane, 1,1,1-tris-(4'-hydroxyphenyl)-ethane, 1,1,1-tris-(hydroxyphenyl)-propane, 1,1,3-tris-(dihydroxy-3-methylphenyl)-propane, 1,1,4-tris-(dihydroxyphenyl)-butane, 1,1,5-tris-(hydroxyphenyl)-3-methylpentane, trimethylolpropane ethoxylates of the formula:

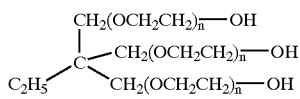

in which n is an integer, or trimethylolpropane propoxylates of the formula:

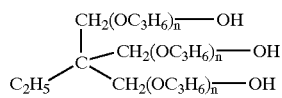

in which n is an integer, for example a trimethylolpropane propoxylate which has a molecular weight of about 1000 Daltons; polyols such as pentaerythritol, dipentaerythritol, and tripentaerythritol; and saccharides, such as cyclodextrin, D-mannose, glucose, galactose, sucrose, fructose, xylose, arabinose, D-mannitol, D-sorbitol, D- or L-arabitol, xylitol, iditol, talitol, allitol, altritol, guilitol, erythritol, threitol, and D-gulonic--lactone; and the like. Mixtures of two or more such compounds can be used. Especially preferred are aliphatic hydroxylic compounds which contain from 3 to about 8 hydroxy groups.

The invention further provides a thermoplastic molding composition comprising a polymer component comprising polyethylene terephthalate or a copolyester thereof, and an amount effective to cause reduction of the level of acetaldehyde resulting after processing thereof of a hydroxylic compound uniformly distributed therein, the hydroxylic compound being selected from aliphatic hydroxylic compounds containing at least two hydroxy groups, aliphatic-cycloaliphatic compounds containing at least two hydroxy groups, and cycloaliphatic hydroxylic compounds containing at least two hydroxy groups.

Also provided in accordance with the present invention is a process for the production of a molded article which comprises providing a thermoplastic molding composition comprising a polymer component comprising polyethylene terephthalate or a copolyester thereof, having an amount effective to cause reduction of the level of acetaldehyde resulting after processing thereof of a hydroxylic compound uniformly distributed therein, the hydroxylic compound being selected from aliphatic hydroxylic compounds containing at least two hydroxy groups, aliphatic-cycloaliphatic compounds containing at least two hydroxy groups, and cycloaliphatic hydroxylic compounds containing at least two hydroxy groups, and subjecting the thermoplastic molding composition to an injection molding step thereby to form a molded article. Such a molded article can be a preform for use in a subsequent blow molding step to form a bottle.

The invention also provides the use of a hydroxylic compound selected from aliphatic hydroxylic compounds containing at least two hydroxy groups, aliphatic-cycloaliphatic compounds containing at least two hydroxy groups, and cycloaliphatic hydroxylic compounds containing at least two hydroxy groups as an additive to a thermoplastic molding composition comprising a polymer component comprising polyethylene terephthalate or a copolyester thereof for the reduction of the amount of acetaldehyde formed upon subjecting the molding composition to melt processing.

By following the teachings of the invention it is possible to produce a thermoplastic polyester material with excellent reduction in levels of aldehyde without producing any discoloration of the material upon processing thereof. Thus, it is possible to produce preforms and bottles of excellent clarity and lack of haze or color by injection molding a polymer composition containing polyethylene terephthalate or a copolyester thereof, optionally in admixture with a polyamide, and a hydroxylic compound selected from aliphatic hydroxylic compounds containing at least two hydroxy groups, aliphatic-cycloaliphatic compounds containing at least two hydroxy groups, and cycloaliphatic hydroxylic compounds containing at least two hydroxy groups, so as to form a preform and thereafter blow molding the resultant preform to form a bottle which exhibits a greatly reduced amount of free acetaldehyde compared with preforms and bottles which lack the added aliphatic hydroxylic compound.

The hydroxylic compound can be used in combination with an antioxidant. In view of the desire in the packaging industry for transparency in the finished polyethylene terephthalate articles, such as bottles, it is preferred to utilize antioxidants which do not tend to give rise to colored reaction products. Thus, although amine antioxidants are widely used in the rubber industry, the fact that many of them tend to give rise to colored products is not usually a problem because the rubber product is very often filled with a highly colored filler, such as carbon black. However, amine antioxidants are generally not suitable for use in the present invention since many of them tend to impart an unacceptable color to any product in which they are incorporated due to the formation of colored oxidation products.

The antioxidant is preferably selected from the group consisting of hindered phenol antioxidants, phosphite antioxidants, phosphonate antioxidants, phosphonite antioxidants, phosphate antioxidants and lactone antioxidants.

A preferred class of antioxidants for use in the present invention is hindered phenol antioxidants. Such compounds typically contain bulky groups, often tertiary alkyl groups or tertiary aralkyl groups, in the 2- and/or 6-positions of the phenol ring as well as often a 4-substituent. Amongst such antioxidants there can be mentioned 4-substituted-2,6-di-tertiary butyl phenols. A particularly preferred example of such an antioxidant is α-tocopherol, which has the formula:

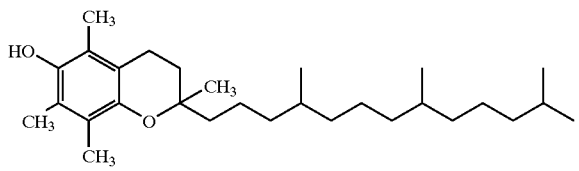

This compound occurs in nature and is known as Vitamin E. The naturally occurring compound has the R,R,R chiral configuration. It is, however, available in synthetic form as d,1-α-tocopherol. Preferably the synthetic form, d,1-α-tocopherol, is used. The synthetic form has 8 isomers each having a different chiral configuration.

Other hindered phenol antioxidants which can be considered for use in the present invention are those of the general formula:

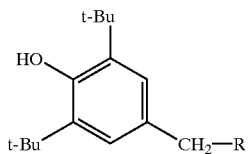

in which R is hydrogen,

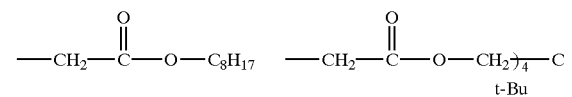

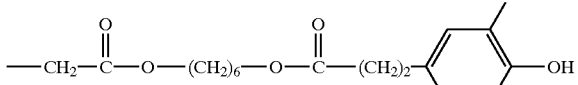

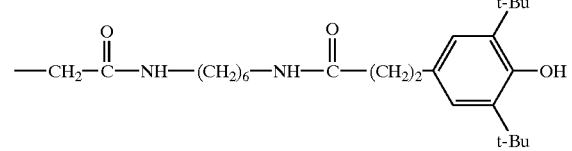

or

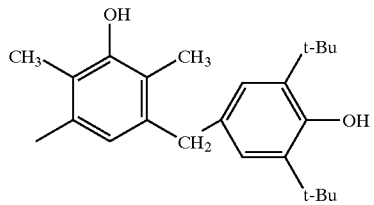

Other hindered phenol antioxidants include antioxidants containing an isocyanurate group of the formula:

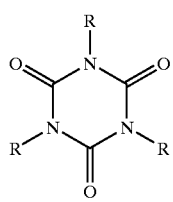

where R is

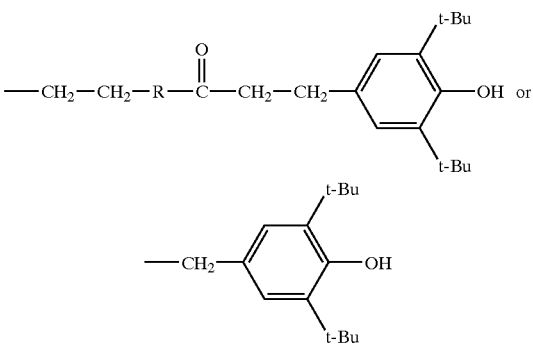

Another type of hindered phenol antioxidant which can be considered for use in the present invention is exemplified by compounds of the formula:

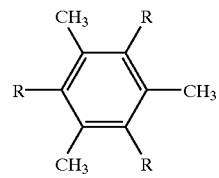

in which R is

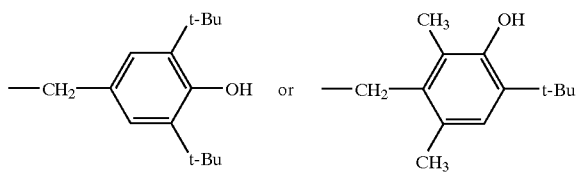

Yet another type of hindered phenol antioxidant is exemplified by the hexahydro-1,3,5-triazine compound of the formula:

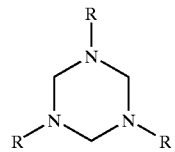

in which R represents a group of the formula:

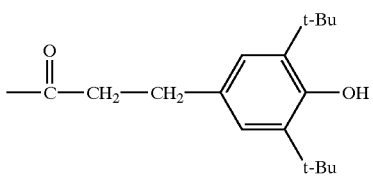

Lactone-based antioxidants can alternatively be used, for example, the antioxidant of the formula:

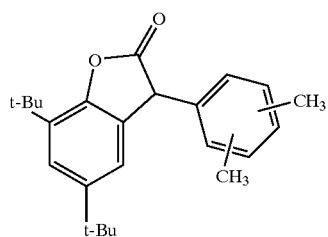

Phosphite antioxidants are another class of antioxidants that can be used, for example, those of the formula:

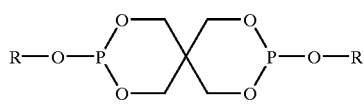

in which R is:

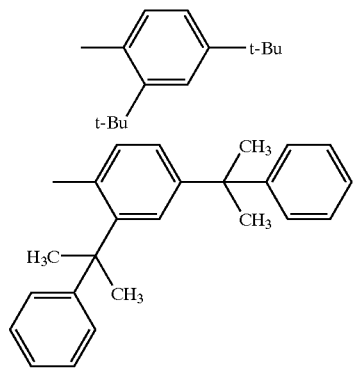

or $C_{18}H_{37}$.

Other phosphite antioxidants include those of the formula

in which R represents a group of the formula:

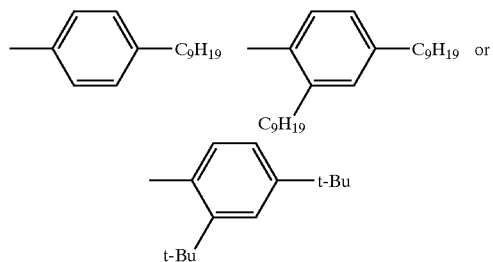

Also there can be mentioned phosphonate antioxidants of the formula:

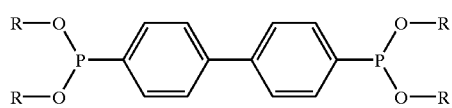

in which R represents a group of the formula:

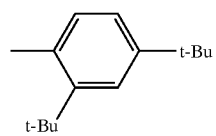

as well as those of the formula:

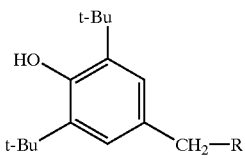

in which R represents a group of formula:

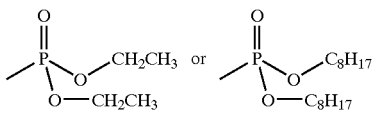

The advantage of using α-tocopherol is that, not only is it an extremely efficient antioxidant, but also it is non-toxic. Thus, it is an extremely suitable material to use in a packaging material that is to be used for packaging bottled drinks and other foodstuffs.

A mixture of two or more antioxidants of the same or different type can be used, if desired. For example, it is possible to use a mixture of a hindered phenol type of antioxidant and a phosphite type of antioxidant.

It is preferred that in the polymer additive of the invention the hydroxylic compound:liquid carrier weight ratio ranges from about 0.1:1 to about 3:1. Preferably this ratio is from about 0.5:1 to about 1.5:1.

The amount of hydroxylic compound to be used in the thermoplastic molding composition can vary within wide limits but typically ranges from about 0.0001% by weight up to about 2% by weight based upon the weight of the polymer component, i.e. the polyester or copolyester or blend thereof with a polyamide. More preferably the amount of hydroxylic compound used ranges from about 0.01% by weight up to about 1% by weight based upon the polymer component.

The amount of antioxidant or mixture of antioxidants, when used in the thermoplastic molding composition, can vary within wide limits but typically ranges from about 0.0001% by weight up to about 2% by weight based upon the weight of the polymer component, i.e. the polyester or copolyester or blend thereof with a polyamide. More preferably, the amount of antioxidant or antioxidant mixture used ranges from about 0.01% by weight up to about 1% by weight based upon the polymer component.

The polymer additive composition of the invention preferably includes a polymer-compatible organic liquid carrier. Such a carrier must be compatible with the polyethylene terephthalate or copolyester thereof and with the other components to be included in the thermoplastic molding composition of the invention. Typical carriers includes hydrocarbons, hydrocarbon mixtures, alcohols, esters and mixtures of two or more thereof.

Preferably, the polyester-compatible organic liquid carrier is an oil-based vehicle. Examples of such vehicles are the materials sold as Clearslip™ 2 and Clearslip™ 3 by Color-Matrix Europe Ltd, Merseyside, GB.

It is preferred that in the polymer additive of the invention the antioxidant:liquid carrier weight ratio ranges from about 0.1:1 to about 3:1. Preferably this ratio is from about 0.5:1 to about 15:1.

In practicing the invention at least one polyester-compatible colorant can be incorporated in the additive.

Although it will normally be convenient to incorporate the hydroxylic compound and the optional ingredients, including any antioxidant and any colorant, into the thermoplastic molding composition of the invention in the form of the polymer additive of the invention, it is alternatively possible, under appropriate conditions to add these components to the polyethylene terephthalate, copolyester thereof, or admixture with a polyamide, in undiluted form. In this case no organic liquid carrier is used.

The invention is further illustrated in the following Examples in which all parts are by weight, unless otherwise specified.

EXAMPLES 1 TO 11

A series of polymer additive mixtures was made up by mixing the ingredients listed in Table 1 in the ratio of the listed amounts. Each mixture was then used in conjunction with the specified weight of a granular polyethylene terephthalate (PET) molding composition to form bottle preforms with a weight of 46.9 g. A comparison preform was prepared on the same occasion under identical conditions in each case, except that the additive mixture under test was omitted.

In each of Examples 1 to 11 the polyester was extruded in the presence of the additive mixture in an injection molding machine having two cavities using a mold temperature of 283° C., a barrel temperature of 278° C. at the nozzle end and 275° C. in the rest of the barrel, an injection pressure of 100 bar and a cycle time of 38.5 s. The acetaldehyde content of the resulting preforms was determined by the liquid/gas headspace chromatography technique described by F. Villain et al., Journal of Polymer Science, Vol. 52, 55–60 (1994). The results are set out in Table 1.

EXAMPLES 12 AND 13

The same general procedure was followed in these Examples as in Examples 1 to 11, except that trimethylolpropane was replaced by dipentaerythritol (DPE) and tripentaerythritol (TPE) respectively. The results are set out below in Table 2.

EXAMPLES 14 TO 16

The same general procedure was followed as in Examples 1 to 11, except that the bottle preforms weighing 28 g each were extruded using a commercial injection molding machine having 48 cavities. The injection pressure was 100 bar, while the barrel temperature ranged from 295° C. at its nozzle end to 285° C. at its inlet end, with intermediate parts of the barrel being at 279° C. The results are set out below in Table 3. Examples 14 and 15 used Clearslip™ 2 while Example 16 used Clearslip™ 3.

EXAMPLES 17 TO 20

In these Examples, various commercial injection molding machines were used to make bottle preforms under conditions similar to those described above in relation to Examples 14 to 16. The results are summarized in Table 4 below.

EXAMPLES 21 TO 35

In these Examples the same general procedure was used as was used in Examples 1 to 11. The results are set out below in Table 5.

EXAMPLE 36

A colored additive was prepared by mixing the following ingredients:

TABLE 1

| Example No. | Trimethylolpropane | Vitamin E | U-626 | Clearslip ™ 2 | Parts of PET | % reduction of CH$_3$CHO |
|---|---|---|---|---|---|---|
| 1 | 0.27 | 0.10 | 0.00 | 0.15 | 99.58 | 65 |
| 2 | 0.20 | 0.17 | 0.00 | 0.00 | 99.63 | 62 |
| 3 | 0.20 | 0.10 | 0.20 | 0.00 | 99.50 | 59 |
| 4 | 0.20 | 0.10 | 0.20 | 0.25 | 99.25 | 63 |
| 5 | 0.20 | 0.17 | 0.00 | 0.00 | 99.63 | 59 |
| 6 | 0.27 | 0.00 | 0.00 | 0.00 | 99.73 | 59 |
| 7 | 0.34 | 0.00 | 0.00 | 0.18 | 99.48 | 59 |
| 8 | 0.28 | 0.10 | 0.00 | 0.15 | 99.52 | 62 |
| 9 | 0.22 | 0.17 | 0.00 | 0.10 | 99.51 | 62 |
| 10 | 0.39 | 0.17 | 0.00 | 0.13 | 99.31 | 62 |
| 11 | 0.35 | 0.17 | 0.00 | 0.00 | 99.48 | 66 |

Note
U-626 is a bis-phosphite of pentaerythritol having the formula:

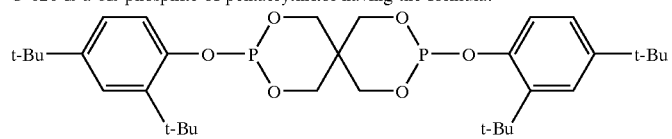

TABLE 2

| Example No. | Type | Amount | Vitamin E | Clearslip™ 2 | Parts of PET | % reduction of CH₃CHO |
|---|---|---|---|---|---|---|
| 12 | DPE | 0.32 | 0.10 | 0.18 | 99.50 | 66 |
| 13 | TPE | 0.28 | 0.10 | 0.18 | 99.44 | 66 |

TABLE 3

| Example No. | Trimethylopropane | Vitamin E | Clearslip™ | Parts of PET | % reduction of CH₃CHO |
|---|---|---|---|---|---|
| 14 | 0.12 | 0.045 | 0.135 | 99.835 | 50 |
| 15 | 0.20 | 0.075 | 0.225 | 99.50 | 59 |
| 16 | 0.135 | 0.00 | 0.165 | 99.50 | 29 |

TABLE 4

| | | | Additive Components | | | | | |
|---|---|---|---|---|---|---|---|---|
| Example | Additive wt % | Vitamin E wt % | TMP wt % | DPE wt % | TPE wt % | Clearslip 2 | Clearslip 3 | % reduction of CH₃CHO |
| 17 | 0.2 | — | — | 0.1 | — | — | 0.1 | 37 |
| 18 | 0.3 | — | — | 0.15 | — | — | 0.15 | 46 |
| 19 | 0.5 | — | — | 0.25 | — | — | 0.25 | 55 |
| 20 | 0.2 | — | — | — | 0.1 | — | 0.1 | 40 |

TABLE 5

| Example | Additive wt % | Vitamin E wt % | TMP wt % | DPE wt % | TPE wt % | Clearslip™ 2 | Clearslip™ 3 | % reduction of CH₃CHO |
|---|---|---|---|---|---|---|---|---|
| 21 | 0.3 | 0.015 | 0.143 | — | — | 0.143 | — | 61 |
| 22 | 0.5 | 0.025 | 0.238 | — | — | 0.238 | — | 67 |
| 23 | 0.7 | 0.035 | 0.333 | — | — | 0.333 | — | 64 |
| 24 | 0.3 | 0.015 | 0.150 | — | — | 0.135 | — | 64 |
| 25 | 0.5 | 0.225 | 0.250 | — | — | 0.225 | — | 67 |
| 26 | 0.3 | 0.015 | — | — | 0.165 | 0.120 | — | 70 |
| 27 | 0.5 | 0.025 | — | — | 0.275 | 0.200 | — | 64 |
| 28 | 0.3 | — | 0.15 | — | — | 0.15 | — | 42 |
| 29 | 0.5 | — | 0.25 | — | — | 0.25 | — | 58 |
| 30 | 0.7 | — | 0.35 | — | — | 0.35 | — | 58 |
| 31 | 0.3 | — | — | 0.15 | — | 0.15 | — | 52 |
| 32 | 0.5 | — | — | 0.25 | — | 0.25 | — | 64 |
| 33 | 0.7 | — | — | 0.35 | — | 0.35 | — | 61 |
| 34 | 0.3 | — | — | — | 0.165 | 0.135 | — | 58 |
| 35 | 0.5 | — | — | — | 0.275 | 0.225 | — | 64 |

EXAMPLE 36

A colored additive was prepared by mixing the following ingredients:
53.50% Clearslip™ 2
40.00% dipentaerythritol
1.00% dl- α-tocopherol
1.50% Solvent Blue 104

This additive was incorporated in bottle preforms as described in Example 1 in an amount of 0.25% of the weight of the botle preform. Bottles were blow molded from such preforms. Good results were obtained.

The contents of all documents referenced in this disclosure are incorporated by reference in their entirety.

Although the present invention has been discussed in considerable detail with reference to certain preferred embodiments, other embodiments are possible. Therefore, the scope of the appended claims should not be limited to the description of preferred embodiments contained in this disclosure.

What is claimed is:

1. A method for making a molded article with decreased levels of acetaldehyde, comprising:
   (a) providing a thermoplastic molding composition comprising (i) a polymer component selected from the group consisting of polyethylene terephthalate, a copolyester of polyethylene terephthalate, and a combination of polyethylene terephthalate and a copolyester of polyethylene terephthalate; and (ii) a polymer additive comprising one or more than one hydroxylic compound comprising from 3 to about 8 hydroxy groups; and
   (b) injection molding the thermoplastic molding composition to form a molded article;
   where the amount of one or more than one hydroxylic compound is present in an amount from about 0.0001% to about 2% by weight of the polymer component, and the amount is sufficient to decrease the level of acetaldehyde in the molded article that would otherwise result without including the one or more than one hydroxylic compound in the thermoplastic molding composition.

2. The method of claim 1, where the hydroxylic compound is selected from the group consisting of an aliphatic hydroxylic compound, an aliphatic-cycloaliphatic hydroxylic compound and a cycloaliphatic hydroxylic compound.

3. The method of claim 1, where the hydroxylic compound is selected from the group consisting of triglycerin, trimethylolpropane, dipentaerythritol, tripentaerythritol, D-mannitol, D-sorbitol and xylitol.

4. The method of claim 1, where two of the hydroxy groups of the hydroxylic compound are separated from one another by exactly one carbon atom.

5. The method of claim 1, where the polymer additive further comprises a liquid carrier.

6. The method of claim 5, where the one or more than one hydroxylic compound is substantially uniformly distributed in the liquid carrier.

7. The method of claim 5, where the ratio of the weight of the hydroxylic compound to the weight of the liquid carrier is, from about 0.1:1 to about 1.5:1.

8. The method of claim 5, where the liquid carrier comprises a polyester-compatible organic oil-based vehicle.

9. The method of claim 1, where the polymer additive further comprises one or more than one polyester-compatible colorant.

10. The method of claim 1, where the polymer additive further comprises an antioxidant.

11. The method of claim 10, where the antioxidant is a hindered phenol antioxidant.

12. The method of claim 10, where the antioxidant is selected from the group consisting of a 4-substituted-2,6-di-tertiary butyl phenol and an α-tocopherol.

13. The method of claim 10, where the antioxidant has the formula:

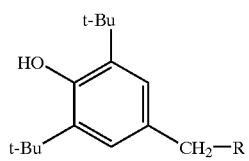

in which R is hydrogen,

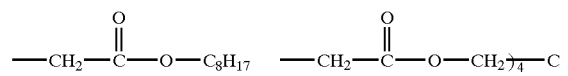

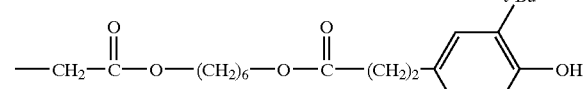

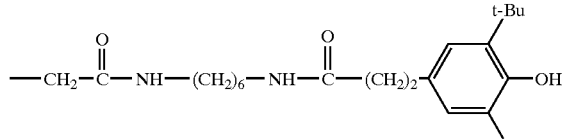

or

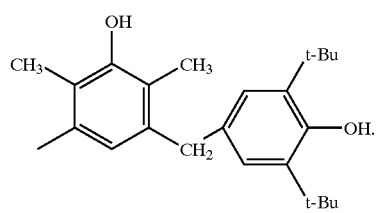

14. The method of claim 10, where the antioxidant comprises d,1-α-tocopherol.

15. The method of claim 10, where the antioxidant comprises a phosphite antioxidant.

16. The method of claim 15, where the phosphite antioxidant has the structure:

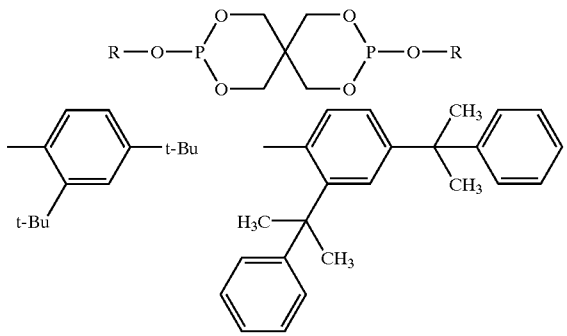

or $C_{18}H_{37}$.

17. The method of claim 1, where the thermoplastic molding composition further comprises one or more than one polyester-compatible colorant.

18. The method of claim 1, where the thermoplastic molding composition further comprises an antioxidant.

19. The method of claim 18, where the antioxidant is a hindered phenol antioxidant.

20. The method of claim 18, where the antioxidant is selected from the group consisting of a 4-substituted-2,6-di-tertiary butyl phenol and an α-tocopherol.

21. The method of claim 18, where the antioxidant has the formula:

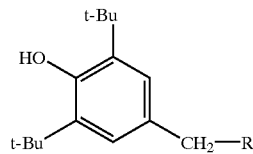

where R is hydrogen,

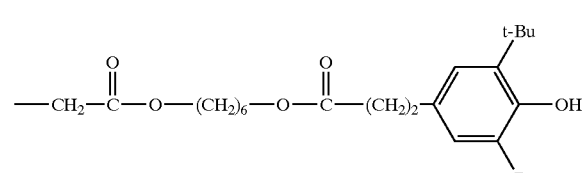

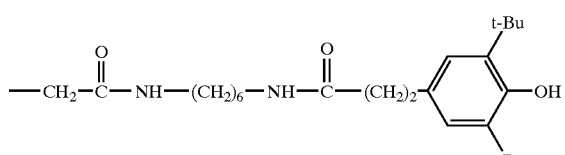

-continued
or

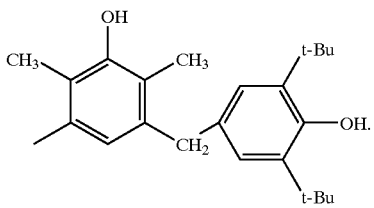

22. The method of claim 18, where the antioxidant comprises d,1-α-tocopherol.

23. The method of claim 18, where the antioxidant comprises a phosphite antioxidant.

24. The method of claim 23, where the phosphite antioxidant has the structure:

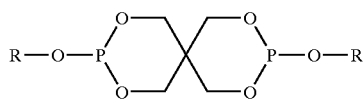

where R is

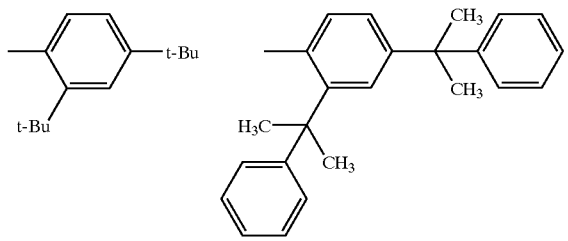

or $C_{18}H_{37}$.

25. The method of claim 1, where the polymer component further comprises a polyamide.

26. The method of claim 1, where the molded article is a preform for use in forming a bottle.

27. The method of claim 1, where the molded article is a bottle.

28. A method for making a molded article with decreased levels of acetaldehyde, comprising:
(a) providing a composition comprising one or more than one hydroxylic compound comprising two or more than two hydroxy groups; and
(b) injection molding the composition to form a molded article;
where the amount of one or more than one hydroxylic compound is present in an amount from about 0.0001% to about 2% by weight of the polymer component, and the amount is sufficient to decrease the level of acetaldehyde in the molded article that would otherwise result without including the one or more than one hydroxylic compound in the composition.

29. The method of claim 28, where the hydroxylic compound provided comprises from three to about eight hydroxy groups.

30. The method of claim 28, where the hydroxylic compound provided is selected from the group consisting of an aliphatic hydroxylic compound, an aliphatic-cycloaliphatic hydroxylic compound and a cycloaliphatic hydroxylic compound.

31. The method of claim 28, where the hydroxylic compound provided is selected from the group consisting of triglycerin, trimethylolpropane, dipentaerythritol, tripentaerythritol, D-mannitol, D-sorbitol and xylitol.

32. The method of claim 28, where the molded article formed is a preform for use in forming a bottle.

33. The method of claim 28, where the molded article formed is a bottle.

34. A method for making a molded article with decreased levels of acetaldehyde, comprising:
(a) providing a composition comprising a polymer additive comprising one or more than one hydroxylic compound comprising two or more than two hydroxy groups; and
(b) injection molding the composition to form a molded article;
where the amount of one or more than one hydroxylic compound is present in an amount from about 0.0001% to about 2% by weight of the polymer component, and the amount is sufficient to decrease the level of acetaldehyde in the molded article that would otherwise result without including the one or more than one hydroxylic compound in the composition.

35. The method of claim 34, where the hydroxylic compound provided comprises from three to about eight hydroxy groups.

36. The method of claim 34, where the hydroxylic compound provided is selected from the group consisting of an aliphatic hydroxylic compound, an aliphatic-cycloaliphatic hydroxylic compound and a cycloaliphatic hydroxylic compound.

37. The method of claim 34, where the hydroxylic compound provided is selected from the group consisting of triglycerin, trimethylolpropane, dipentaerythritol, tripentaerythritol, D-mannitol, D-sorbitol and xylitol.

38. The method of claim 34, where two of the hydroxy groups of the hydroxylic compound provided are separated from one another by exactly one carbon atom.

39. The method of claim 34, where the polymer additive further comprises a liquid carrier.

40. The method of claim 39, where the one or more than one hydroxylic compound is substantially uniformly distributed in the liquid carrier.

41. The method of claim 39, where the ratio of the weight of the hydroxylic compound to the weight of the liquid carrier is from about 0.1:1 to about 1.5:1.

42. The method of claim 39, where the liquid carrier comprises a polyester-compatible organic oil-based vehicle.

43. The method of claim 34, where the polymer additive further comprises one or more than one polyester-compatible colorant.

44. The method of claim 34, where the polymer additive further comprises an antioxidant.

45. The method of claim 44, where the antioxidant is a hindered phenol antioxidant.

46. The method of claim 44, where the antioxidant is selected from the group consisting of a 4-substituted-2,6-di-tertiary butyl phenol and an α-tocopherol.

47. The method of claim 44, where the antioxidant has the formula:

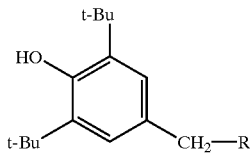

in which R is hydrogen,

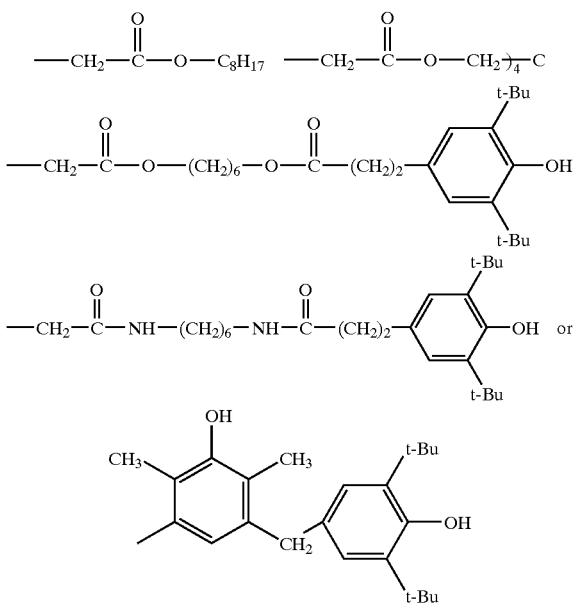

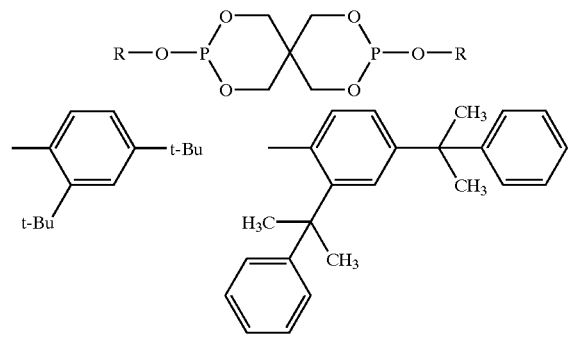

48. The method of claim 44, where the antioxidant comprises d,1-α-tocopherol.

49. The method of claim 44, where the antioxidant comprises a phosphite antioxidant.

50. The method of claim 44, where the phosphite antioxidant has the structure:

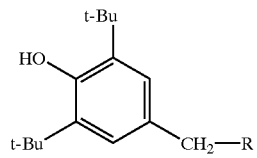

or $C_{18}H_{37}$.

51. The method of claim 34, where the composition further comprises one or more than one polyester-compatible colorant.

52. The method of claim 34, where the composition further comprises an antioxidant.

53. The method of claim 52, where the antioxidant is a hindered phenol antioxidant.

54. The method of claim 52, where the antioxidant is selected from the group consisting of a 4-substituted-2,6-di-tertiary butyl phenol and an α-tocopherol.

55. The method of claim 52, where the antioxidant has the formula:

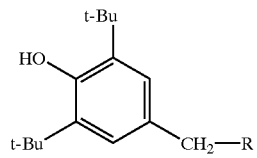

where R is hydrogen,

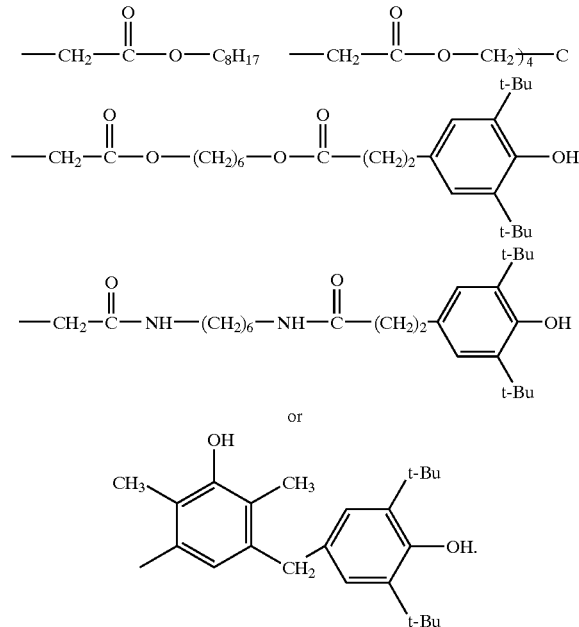

56. The method of claim 52, where the antioxidant comprises d,1-α-tocopherol.

57. The method of claim 52, where the antioxidant comprises a phosphite antioxidant.

58. The method of claim 57, where the phosphite antioxidant has the structure:

where R is

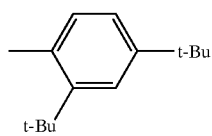

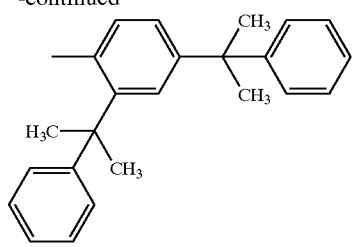
or $C_{18}H_{37}$.
59. The method of claim 34, where the molded article formed is a preform for use in forming a bottle.
60. The method of claim 34, where the molded article formed is a bottle.
* * * * *